United States Patent
Rommel et al.

(10) Patent No.: US 10,678,419 B2
(45) Date of Patent: Jun. 9, 2020

(54) BI-DIRECTIONAL COMMUNICATION BETWEEN WINDOWS

(71) Applicant: SAP SE, Walldorf (DE)

(72) Inventors: Roman Rommel, Neustadt an der Weinstraße (DE); Jan-Michel Blinn, Osthofen (DE)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 15/461,827

(22) Filed: Mar. 17, 2017

(65) Prior Publication Data
US 2018/0267684 A1    Sep. 20, 2018

(51) Int. Cl.
| | | |
|---|---|---|
| *G06F 3/0486* | (2013.01) | |
| *G06F 3/0482* | (2013.01) | |
| *G06F 3/0481* | (2013.01) | |
| *G09G 5/14* | (2006.01) | |

(52) U.S. Cl.
CPC .......... *G06F 3/0486* (2013.01); *G06F 3/0481* (2013.01); *G06F 3/0482* (2013.01); *G06F 2203/04803* (2013.01); *G09G 5/14* (2013.01)

(58) Field of Classification Search
CPC ................. G06F 3/0482; G06F 3/0486; G06F 2203/04803
See application file for complete search history.

(56) References Cited

U.S. PATENT DOCUMENTS

| | | | | |
|---|---|---|---|---|
| 9,946,452 | B1* | 4/2018 | Jitkoff | G06F 3/0486 |
| 2006/0184894 | A1* | 8/2006 | Daniels | G06F 3/0482 |
| | | | | 715/783 |
| 2006/0230333 | A1* | 10/2006 | Racovolis | G06F 17/2241 |
| | | | | 715/205 |
| 2017/0147129 | A1* | 5/2017 | Kyoun | H04N 21/4402 |

OTHER PUBLICATIONS

Donald_Duck, "Make IE open new window in different browser", asked: May 21, 2016, answered: May 22, 2016 in Answer 1, superuser.com, https://superuser.com/questions/1079206/make-ie-open-new-window-in-different-browser (Year: 2016).*
Harvey, "Microsoft Excel 2010 All-In-One for Dummies", copyright: 2010, Wiley Publishing, Inc. (Year: 2010).*

* cited by examiner

*Primary Examiner* — Seth A Silverman
(74) *Attorney, Agent, or Firm* — Sterne, Kessler, Goldstein & Fox P.L.L.C.

(57) ABSTRACT

Disclosed herein are system, method, and computer program product embodiments for a system for bi-directional communication between windows. An embodiment operates by receiving a panel selection of a second panel of a first window comprising at least a first panel and the second panel. The second panel is undocked from the first window responsive to the panel selection. An item selection is received from either the first window or the second window. It is determined that the item selection corresponds to one of the first window or the second window as a selected window. The displayed information in the unselected window is updated corresponding to the item selection.

20 Claims, 5 Drawing Sheets

BI-DIRECTIONAL COMMUNICATION BETWEEN WINDOWS

BACKGROUND

In the world of multiprocessing systems, users commonly have different windows open that enable them to see more information and potentially increase their productivity or more effectively perform their work. For example, users may have multiple Internet browser windows open on their device that enable them to view or access different information. However, when the data is updated on one open window there is no corresponding data update communicated to any other windows that may be open. Thus, while the data in one window may be current, the data in other windows may be outdated, leading to errors, increasing inefficiencies, and reducing the reliability of the data while using multiple windows.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing bi-directional communication between windows.

Figure 1:
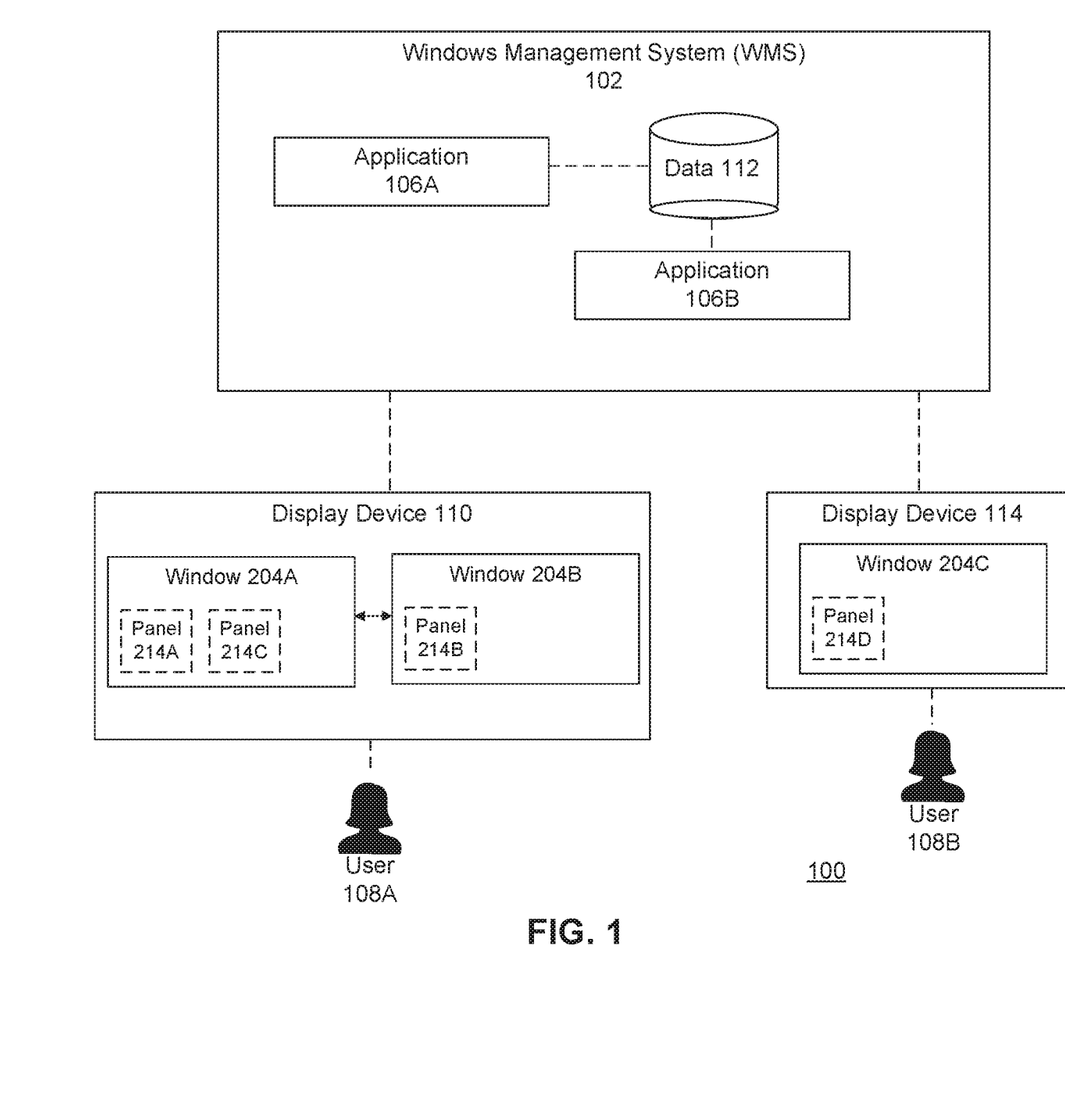
FIG. 1 is a block diagram showing example configurations and operations of a system for bi-directional communications between windows, according to some embodiments.

FIG. 1 is a block diagram showing example configurations and operations of a system for bi-directional communications between windows, according to some embodiments. Windows management system (WMS) 102 may enable bidirectional communication between multiple windows 104 open across one or more applications 106, data sources 112, or devices 110, 114. This bidirectional communication may enable multiple, separate windows 104 to display synchronized, up-to-date, corresponding, and/or related data, thus increasing the reliability and useability of the information displayed in the windows 104 and improving user efficiency.

For example, user 108A may be operating display device 110, such as a laptop, mobile phone, streaming media player, tablet, or other computing device. Window 204A may display data and enable the user to interact with, select, or change/modify the data. Window 204B may also display data, and the data of window 204B may be related to the data of window 204A. For example, window 104A may include a list of subscribers to a particular service, and window 104B may include more detailed information about the subscribers. Or for example, window 204A may include a list of different sports teams, and window 204B may include a list of players on a particular or selected sports team (e.g., selected from window 204A).

WMS 102 may enable user 108A to select different subscribers or teams from window 204A, communicate the selection or data change to window 204B, and the change or new selection be reflected in the information displayed in window 204B. This may include, for example, providing new or relevant data 112 to window 204B to replace the previously displayed data.

This communication may occur the other way (e.g., bi-directionally) as well. For example, user 108 may update the name of a subscriber in window 108B, and that information may be immediately and in real-time reflected in window 104A (without requiring user 108A to request a refresh or other update). Or for example, a user may select a particular player from window 204B and information about that player (such as position, statistics, previous teams, etc.) may be displayed in window 204A or another window 204C (including window 204B). WMS 102 may enable bi-directional communication between multiple windows 104 that may be displayed as independent windows 104 or application instances across one or more display devices 110, 114 or user interfaces.

Figure 2:
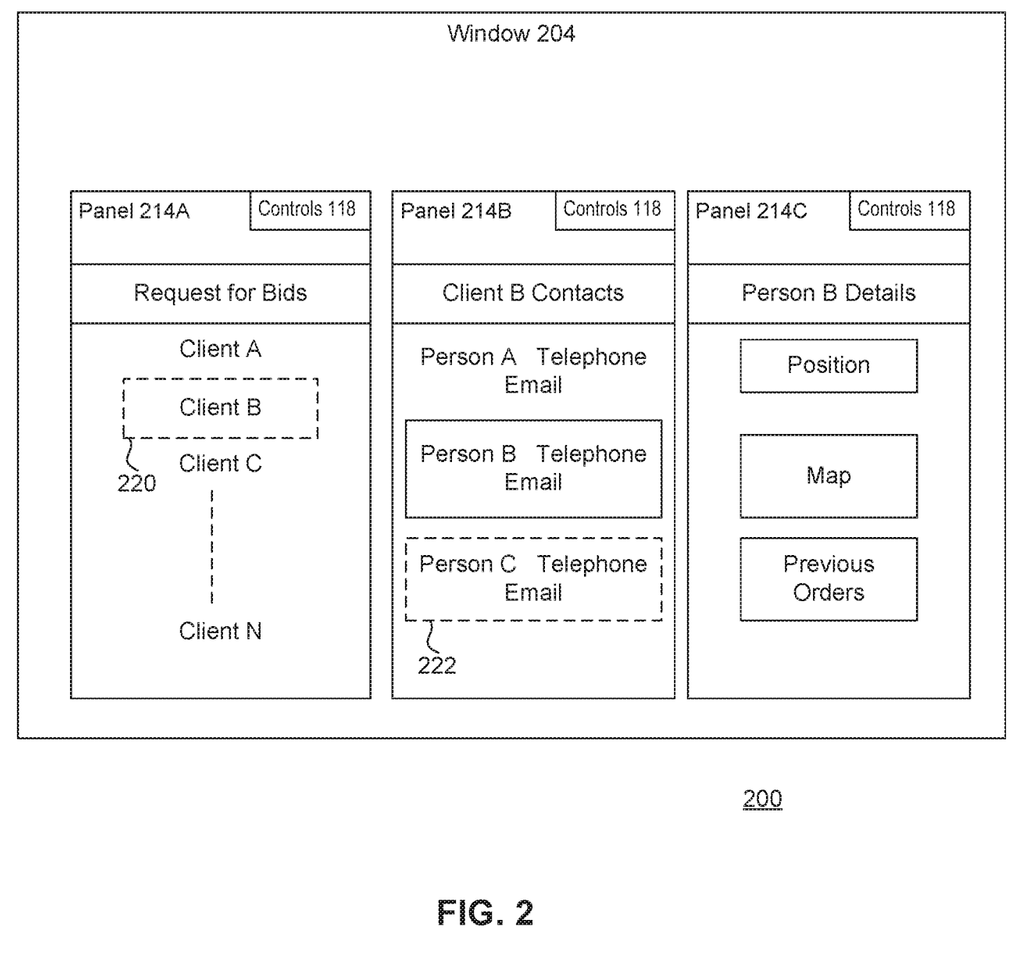
FIG. 2 illustrates an example window, according to an example embodiment.

FIG. 2 illustrates example operations of a system for bi-directional communications between windows, according to some embodiments. Window 204 may include a number of different panels 214.

Panels 214A-C may be subsections of windows and graphical user interfaces used to display different data, functionality, or may be associated with different applications or programs. Panels 214A-C may be graphical user interfaces (GUIs) that may be open, closed, resized, or moved around by users 108. Each panel 214 may be a different view of data 112, enable different operations with respect to data 112, and/or may be associated with different applications 106 that access at least a portion of corresponding, related, or overlapping data 112.

In the example shown, window 204 includes three different panels 214A, 214B, and 214C which may include different but related (although perhaps overlapping) information (e.g., data 112) about clients of a company. Panel 214A may include a list of clients or prospective clients who have requested bids for proposals for particular projects or products. In the example shown, clients A-N may exist, and client B may be selected 220.

Panel 214B may include information related to the selection 220 of panel 21A. In the example shown, panel 214B may include the names and contact information of different persons who work for or on behalf of Client B. Persons A, B, and C may be different points of contacts or employees of Client B. In the example shown. Person C may be selected 222.

Panel 214C may include information related to the selection 222 of panel 214B (of Person C). In the example shown, panel 214C may include a position or title of Person C, a map indicating the location of Person C or sales area for which person C is responsible, and any previous orders, bids, or other contact with Person C.

In the example shown, a new selection in panel 214A would affect the data displayed in both panels 214B and 214C. For example, client C would have different contact persons (as shown in panel 214B) and those contact persons would have different details or information about them (as shown in panel 214C).

In an embodiment, the data displayed in panel 214A may also be dependent on what is displayed or selected in panels 214B and/or 214C, such that the relation or dependence between the panels 214 is bi-directional. Then for example, a change to any of the panels (e.g., a new data selection, or a modification of the data displayed) may be communicated to the other panels 214 which may be dependent or otherwise display data related to the new selection/changed data. In an embodiment, the data may either be updated or changed by user 108A or another system (such as a real-time data stream).

Panels 214 may include controls 118. Controls 118 may provide a user different options with regard to how the user wants the information of the particular panel 214 displayed (e.g., relative to the other panels 214). In an embodiment, controls 118 may include delete, resize, maximize, and undock controls or icons. In an embodiment, similar controls 118 may exist for different windows 204 as well.

The delete control may enable a user to remove the panel 214 from the window 204. Deleting (or otherwise removing or undocking) any panel 214 from window 204 may have the effect of increasing the size of the remaining panels 214 to fill the available window 204 display area.

The resize control may enable a user to increase or decrease the size of any panel (thus having the corresponding effect of decreasing or increasing the size of the other panels 214) within window 204. The maximize control may enable the user to increase the selected panel 214 to fill up the entire display area of window 204 such that remaining panels are removed (no longer displayed) or minimized within window 204. Examples of resizing panels 214 are described in greater detail in patent application titled "Flexible-Page Layout" which is assigned patent application Ser. No. 15/294,133, filed Oct. 14, 2016, which is hereby incorporated by reference in its entirety.

Control 118 may also include an undock control (represented by an undock icon). Undock control may enable a user to drag and drop any particular panel 214 into a new or existing/different window 204. For example, user 108A may drag panel 214B to a location outside the bounds of window 204A to open panel 214B in a new window 204B (see FIG. 1). Or, for example, user 108A may drag panel 214B outside the bounds of window 204A hut inside the bounds of another existing/open window to move panel 214B from one existing window to another.

Upon receiving a drop command at this new location, WMS 102 may interpret this action as an intent to create a new window 204B including the selected panel 214B (or join communications between the existing window and the newly added panel 214B). The communications may occur on a device-to-device level, window-to-window level, or panel-to-panel level.

In an embodiment, user 214B may drop panel 214B to a network location or drive such that panel 214B is displayed in a new window on (or otherwise accessible by) a different device 112. WMS 102 may enable undocked panel 214B (in its own separate window 204B) to remain in communication and synchronized with the remaining panels 214A and 214C as if they all were still part of the same window 204 (as shown in FIG. 2) or operating on the same device 110.

In an embodiment, upon transferring or dropping panel 214B onto a network drive or location corresponding to another device 114, window 214B may be opened in a new window 204 on the other device. Panel 214B may also no longer be displayed on the first device 110 from which it originated. However, panels 214A-C may remain communicatively coupled via the network or network drives as discussed herein. For example, changes to information in one of panels 214A-C may trigger changes or updates to information in one more other panels 214A-C, in which the panels are communicatively coupled to each other on either the same device, across a Bluetooth network, or other network communications.

If a panel 214 has been dragged into a new or different window 204, then for example, when a user 108A tries to close a particular panel 214 or window 204 that is communicatively coupled to another panel 214 in another window 204, the user 108A may be prompted before continuing the close. The prompt may include, for example, an alert, notification, or confirmation communicating that the panel 214/window 204 to be closed is in communication with another panel 214 of another window 204.

In an embodiment, windows 204 may be browser windows corresponding to one or more web browsers such as but not limited to SAFARI, EXPLORER, FIREFOX, or CHROME. When a panel 214B is undocked from a first window 204A to a second window 204B (regardless of whether it is undocked locally on the same device 110, or on a different device 112 directly or indirectly communicatively coupled to the first device 110), the new window 204B may be opened or operable in the same browser environment or may be a window in a browser environment different from the browser environment corresponding to the originating window 204A. For example, window 204A may be a Chrome browser window, while window 204B may be an Explorer browser window. WMS 102 may enable bi-directional communications across the varying browser environments. In an embodiment, WMS 102 may enable the docking/undocking of panels 214 across different browser windows 204 associated with different web browsers.

Controls 118 may also include a redock icon. In an embodiment, the undock icon may also be used as a redock or transfer window icon. For example, user 214B may drag panel 214B from window 204B using the undock icon, back into the bounds of window 204A. Then upon detecting a drop command within the bounds of window 204A, WMS 102 may redock or reunite panel 214B back into window 204A and delete or no longer display window 204B (unless window 204B includes additional information or panels, in which case window 204B may remain in the same location within a user interface with the other remaining information reformatted after removal of panel 214B). Window 204A may then include panels 214A-C with bidirectional communication still in place between the panels 214. Or for example, panel 214B may have been directly opened into window 204B, but may nonetheless be dragged into and docked with the panels 214A and 214C of window 204A.

WMS 102 may enable new selections on a display or changes to data of any panel 214A-C to be communicated to and immediately reflected (in real-time) across the remaining panels 214A-C that depend upon or display information related to the data regardless of whether the panels 214A-C are displayed in one window 204, or across multiple windows 204A and 204B. This may be performed without any additional action or request by any user 108. For example, a selection of client A in panel 214A of windows 204A may be immediately reflected in panel 214B of window 204B.

In an embodiment, the new selection on panel 214A may be communicated to WMS 102 (which may be a separate computing device, operating on the cloud, or operating locally on display device 110, to name just a few examples), which may track which open panels 214 are related to one another. WMS 102 may then communicate the selection or updated data 112 to display device 110 for display within panel 214B of window 204B. Thus, even though panels 214 may be separated into independent windows 204, WMS 102 may enable or persist bi-directional communication between the panels 214 regardless of how many different windows 204 are used.

WMS 102 may enable bi-directional communication between windows 204A and 204B on the same device 110 or across two or more different devices 110, 114. For example, panel 214D may be opened in window 204C of display device 114. The data 112 or operations of panel 214D may be related to one or more of the data 112 or operations of panels 214A, 214B, or 214C. Then for example, an update to the display (e.g., selection) or data 112 of any panel 214A-D may be communicated by WMS 102 to any related panels 214A-D. For example, a new selection may directly impact the data or display of panel 214B, and may indirectly impact the display (e.g., data or operations) of panels 214C and 214D which may be related to the data displayed on 214B. As such, a new selection or change originating at panel 214B may be communicated to panel 214B, and the selection/change to panel 214B may then be communicated to both 214C and 214D. As noted above, this communication may be bi-directional across panels 214, windows 204, and devices 110, 114.

In an embodiment, a user 108A may open a new panel 214B in a new window 204B without panel 214B ever having been previously docked with window 204 or panels 214A or 214C. However, WMS 102 may determine that the display (e.g., data 112 or operations) of panel 214B are related to one or more of panels 214A or 214C, and thus may establish a communications link between windows 204A and 204B.

In an embodiment, communication across devices 110, 114 or user accounts may be based in part on the respective roles of the users 108A, 108B. For example, users 108A, 108B may share similar roles, may be part of the same team, working on the same project, or may report to one another (as manager and employee). Thus WMS 102 may enable bi-directional communication between panels 214A-D for different users 108 based on their roles within a particular organization.

Figure 3A:
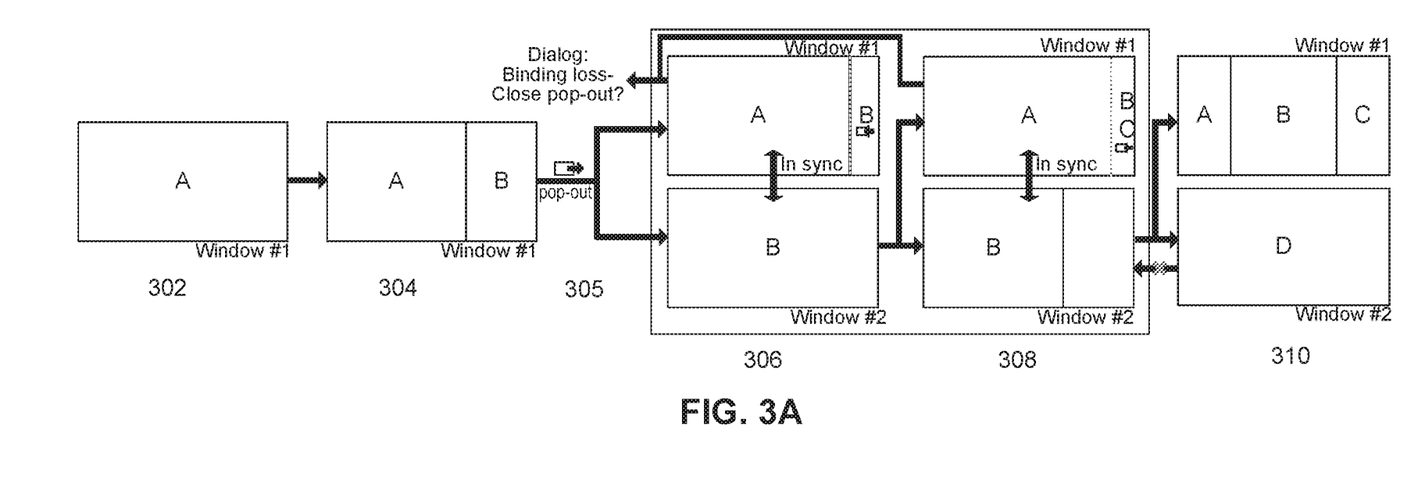
FIGS. 3A and 3B show example operations of a system for bi-directional communications between windows, according to some embodiments.
Figure 3B:
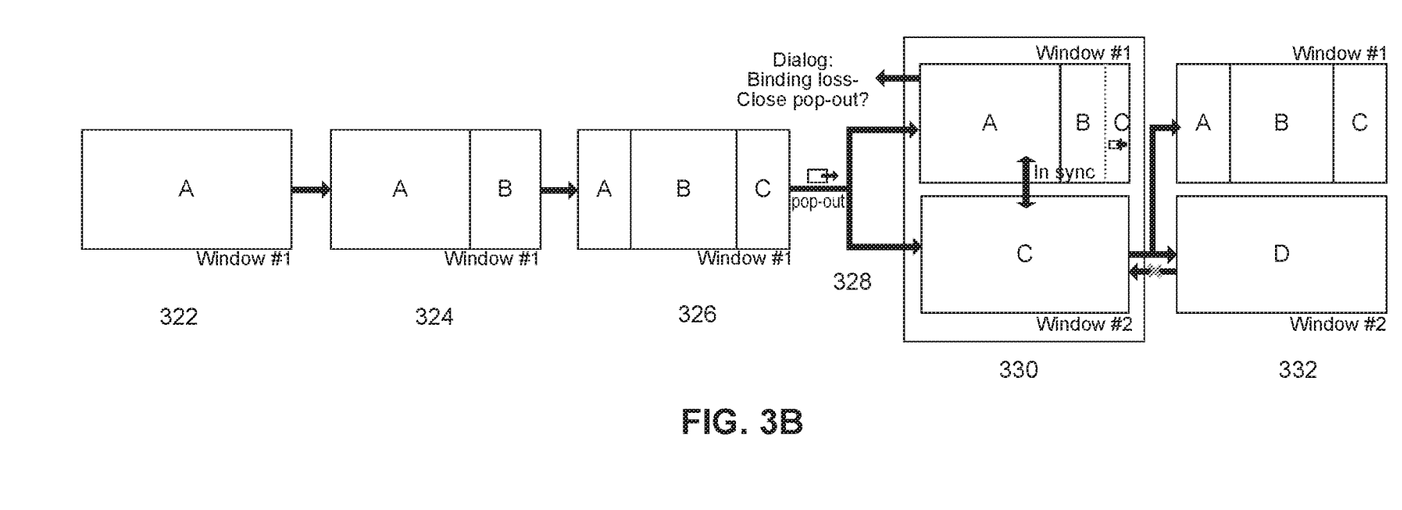

FIGS. 3A and 3B show example operations of a system for bi-directional communications between windows, according to some embodiments. At 302, a window is shown with a single panel A. At 304, a second panel B is opened within the window. At 305, panel B may be undocked or popped out, so that a display device 110 has two windows, each with their own panels (as shown at 306). Even though the panels may be displayed in separate windows, WMS 102 may enable ongoing communications and synchronization between the windows or panels as discussed above.

At 308, panel B may be redocked into (or combined with) window #1 containing panel A, and panel C may be opened as well. As shown in 310, a new application window (including panel D) unrelated to panels A, B, or C may be opened. In 310, while panels A-C remain in communication and synchronization with one another while they are opened (in window #1 or in different windows (not shown), panel D in window #2 may exist and operate independently of panels A-C.

In FIG. 3B, elements 322 and 324 may be similar to what was described above with respect to 302 and 304. At 326 a new panel C may be opened within window #1. At 328, panel C may be popped out into a new window, but panels A, B, and C may remain communicatively coupled via WMS 102 (as shown in 330). At 332, panel C may be redocked into window #1 and a new window with unrelated panel D may be opened as described above with respect to 310.

Figure 4:
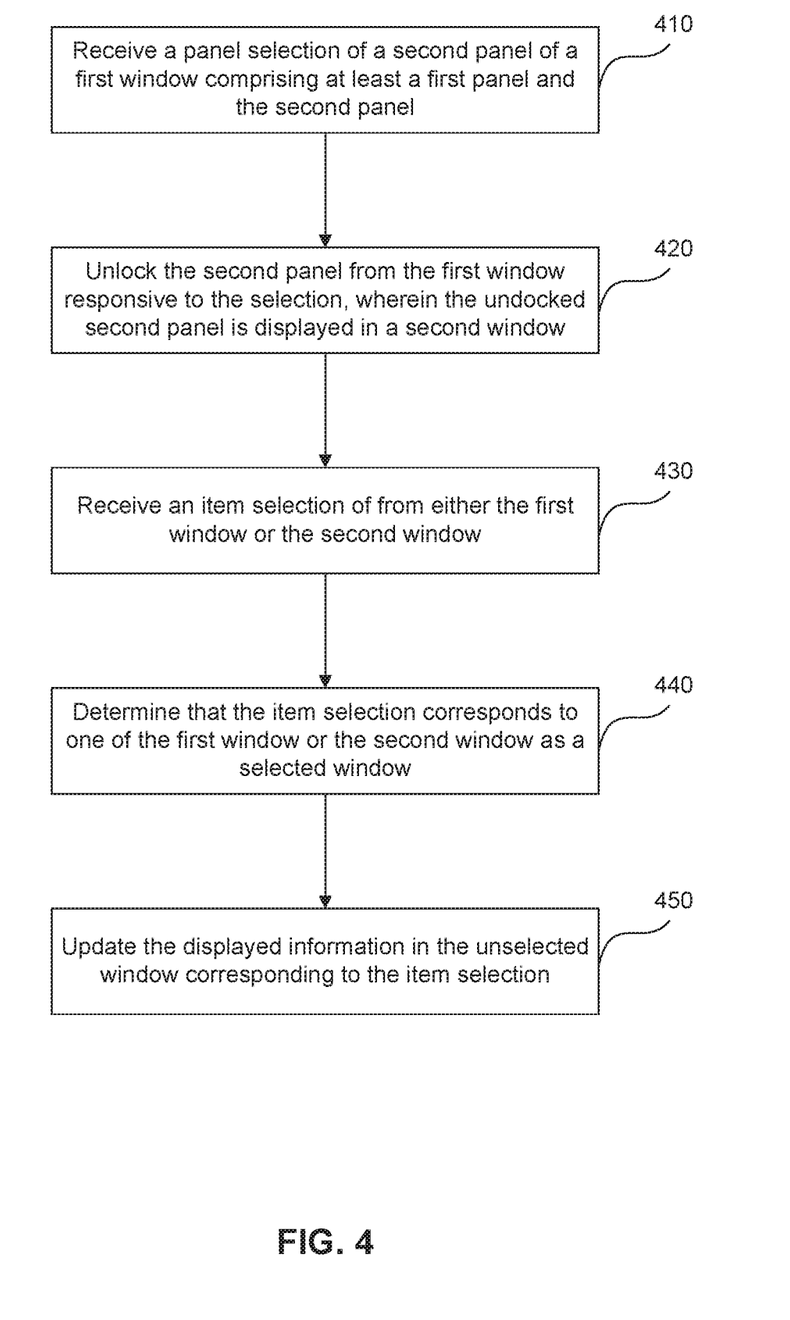
FIG. 4 is a flowchart showing example operations of a system for bi-directional communications between windows, according to some embodiments.

FIG. 4 is a flowchart showing example operations of a system for bi-directional communications between windows, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

At 410, a panel selection of a second panel of a first window (having at least a first panel and the second panel) is received. For example, a selection of undock control 118 may be selected from panel 214B (as shown in FIG. 2). In an embodiment, the selection of the undock control may be an indication of a drag command.

At 420, the second panel is undocked from the first window responsive to receipt of the selection in step 410. For example, as shown in FIG. 1, panel 214B may be moved into a new or existing window 204B. However, windows 204A and 204B (or panels 214 of the windows 204) may remain in communication with one another.

At 430, an item selection of from either the first window or the second window is received. For example, as shown in FIG. 2, Client B may be selected 220 from panel 214A (of window 204A of FIG. 1). The item selection 220 may include an update, addition, deletion, or other modification of data displayed in a particular panel 214A.

At 440, it is determined that the first window or the second window (as they correspond to the item selection) is a selected window (the other window being an unselected window). For example, as shown in FIG. 1, relative to the selection 220, WMS 102 may determine that window 204A is the selected window, and window 204B (and window 204C) is the unselected window.

At 450, the displayed information in the unselected window is updated corresponding to the item selection. For example, WMS 102 may communicate the selection 220 or other updated information from window 204A to window 204B, such that window 204B updates accordingly. In an embodiment, WMS 102 may provide updated data 112 to window 204B responsive to the selection 220.

Figure 5:
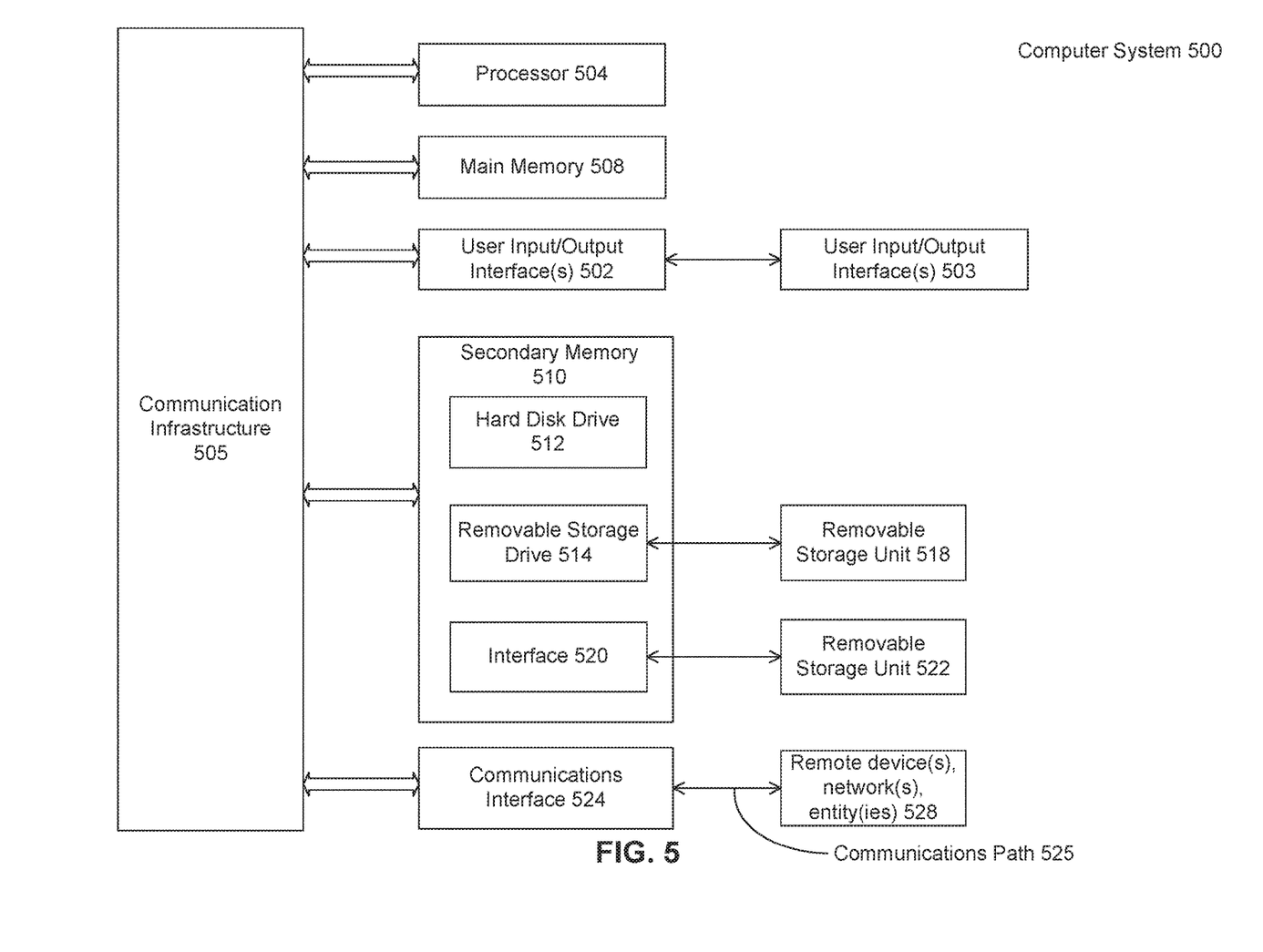
FIG. 5 is an example computer system useful for implementing various embodiments.

Various embodiments can be implemented, for example, using one or more computer systems, such as computer system 500 shown in FIG. 5. Computer system 500 can be used, for example, to implement the systems and operations of FIGS. 1-3A, and/or the methods of FIG. 4. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising: receiving a panel selection of a second panel of a first window comprising at least a first panel and the second panel, wherein the first panel and the second panel are communicatively coupled to each other, and wherein the second panel displays content corresponding to content selected from the first panel; undocking the second panel from the first window on a first network device, wherein responsive to the undocking the undocked second panel is displayed in a second window independent of the first window on a second network device, wherein the first network device and second network device remain communicatively coupled after the undocking; receiving a selection of different content from the first panel from the first window, wherein the selection of different content from the first panel triggers an update of the content displayed in the second panel, and wherein the different content from the first panel remains displayed on the first network device after the update; and updating the content of the second panel in the second undocked window on the second network device responsive to the selection of different content from the first panel from the first window.

2. The method of claim 1, wherein the receiving the panel selection comprises:
receiving a drag selection on the second panel in the first window; and
receiving a drop selection of a location on a user interface outside a bounds of the first window, wherein the undocking comprises moving the second panel from the first window to the second network device corresponding to the drop selection.

3. The method of claim 2, wherein the receiving the drag selection comprises determining that an undock icon of the second panel was selected.

4. The method of claim 1, wherein the undocking comprises:
determining that the panel selection is of the second panel on the first network device;
determining an indication to move the second panel to the second network device; and
opening the second window on the second device comprising the second panel.

5. The method of claim 4, wherein the second panel is not displayed on the first network device after the opening.

6. The method of claim 4, wherein the first window is opened in a first browser environment of the first network device, and wherein the second window is opened in a second browser environment of the second network device.

7. The method of claim 6, wherein the first browser environment is different from the second browser environment.

8. The method of claim 1, wherein the first window is associated with a first application, and wherein the second window is associated with a second application different from the first application.

9. The method of claim 1, further comprising:
receiving a request to close the second window;
determining that the first window is linked to the second window; and
displaying, based on the determination that the first window and the second window are linked, a third window requesting a confirmation to close the second window prior to closing the second window.

10. The method of claim 1, further comprising:
receiving a subsequent modification to second content of the second application from the second window; and
updating the content of the first window based on the subsequent modification.

11. The method of claim 1, further comprising:
receiving a request to close one of the first window or the second window;
determining, responsive to the request, that the first window and the second window remain communicatively coupled;
providing an alert indicating that the first window and the second window remain communicatively coupled; and
requesting a confirmation prior to closing either the first window or the second window.

12. A system, comprising: a memory; and at least one processor of an in-memory database coupled to the memory and configured to: receive a panel selection of a second panel of a first window comprising at least a first panel and the second panel, wherein the first panel and the second panel are communicatively coupled to each other, and wherein the second panel displays content corresponding to content selected from the first panel; undock the second panel from the first window on a first network device, wherein responsive to the undocking the undocked second panel is displayed in a second window independent of the first window on a second network device, wherein the first network device and second network device remain communicatively coupled after the undocking; receive a selection of different content from the first panel from the first window, wherein the selection of different content from the first panel triggers an update of the content displayed in the second panel, and wherein the different content from the first panel remains displayed on the first network device after the update; and update the content of the second panel in the second undocked window on the second network device responsive to the selection of different content from the first panel from the first window.

13. The system of claim 12, wherein, to receive the panel selection, the at least one processor is configured to:
receive a drag selection on the second panel in the first window; and
receive a drop selection of a location on a user interface outside a bounds of the first window, wherein the undocking comprises moving the second panel from the first window to the second network device corresponding to the drop selection.

14. The system of claim 13, wherein, to receive the panel selection, the at least one processor is configured to:
determine that an undock icon of the second panel was selected.

15. The system of claim 12, wherein, to undock, the at least one processor is configured to:
determine that the panel selection is of the second panel on the first network device;
determine an indication to move the second panel to the second network device; and
open the second window on the second device comprising the second panel.

16. The system of claim 15, wherein the second panel is not displayed on the first network device after the opening.

17. The system of claim 15, wherein the first window is opened in a first browser environment of the first network device, and wherein the second window is opened in a second browser environment of the second network device.

18. The system of claim 17, wherein the first browser environment is different from the second browser environment.

19. A non-transitory computer-readable device having instructions stored thereon that, when executed by at least one computing device, causes the at least one computing device to perform operations comprising: receiving a panel selection of a second panel of a first window comprising at least a first panel and the second panel, wherein the first panel and the second panel are communicatively coupled to each other, and wherein the second panel displays content corresponding to content selected from the first panel; undocking the second panel from the first window on a first network device, wherein responsive to the undocking the undocked second panel is displayed in a second window independent of the first window on a second network device, wherein the first network device and second network device remain communicatively coupled after the undocking; receiving a selection of different content from the first panel from the first window, wherein the selection of different content from the first panel triggers an update of the content displayed in the second panel, and wherein the different content from the first panel remains displayed on the first network device after the update; and updating the content of the second panel in the second undocked window on the second network device responsive to the selection of different content from the first panel from the first window.

20. The device of claim 19, wherein the first window is opened in a first browser environment of the first network device, and wherein the second window is opened in a second browser environment of the second network device.

\* \* \* \* \*